(12) United States Patent
Fujii et al.

(10) Patent No.: US 11,466,770 B2
(45) Date of Patent: Oct. 11, 2022

(54) DRIVING FORCE TRANSMISSION APPARATUS

(71) Applicants: JATCO Ltd, Fuji (JP); NISSAN MOTOR CO., LTD., Yokohama (JP)

(72) Inventors: Toshiyuki Fujii, Fuji (JP); Tsutomu Itou, Fujinomiya (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 289 days.

(21) Appl. No.: 16/957,858

(22) PCT Filed: Nov. 15, 2018

(86) PCT No.: PCT/JP2018/042214
§ 371 (c)(1),
(2) Date: Jun. 25, 2020

(87) PCT Pub. No.: WO2019/130878
PCT Pub. Date: Jul. 4, 2019

(65) Prior Publication Data
US 2020/0332883 A1 Oct. 22, 2020

(30) Foreign Application Priority Data
Dec. 27, 2017 (JP) .............................. JP2017-252221

(51) Int. Cl.
*F16H 57/04* (2010.01)

(52) U.S. Cl.
CPC ....... *F16H 57/0426* (2013.01); *F16H 57/043* (2013.01); *F16H 57/0424* (2013.01); *F16H 57/0471* (2013.01); *F16H 57/0489* (2013.01); *F16H 57/0456* (2013.01)

(58) Field of Classification Search
CPC ............. F16H 57/0426; F16H 57/0424; F16H 57/043; F16H 57/0471; F16H 57/0489; F16H 57/0456
USPC ............................................................ 474/91
See application file for complete search history.

(56) References Cited

U.S. PATENT DOCUMENTS

| | | | |
|---|---|---|---|
| 8,991,559 B2* | 3/2015 | Baik ................... | F16H 57/0426 74/473.11 |
| 10,018,266 B2* | 7/2018 | Muto .................. | F16H 57/0446 |
| 10,220,698 B2* | 3/2019 | Shibata .................. | F16H 3/727 |
| 10,619,720 B2* | 4/2020 | Fujimoto .............. | F16C 35/077 |
| 10,767,750 B2* | 9/2020 | Vallet et al. ........ | F16H 57/0426 |

(Continued)

FOREIGN PATENT DOCUMENTS

| JP | 2011-208796 A | 10/2011 |
|---|---|---|
| JP | 2016-114161 A | 6/2016 |

*Primary Examiner* — Ha Dinh Ho
(74) *Attorney, Agent, or Firm* — Foley & Lardner LLP

(57) ABSTRACT

A side cover of a continuously variable transmission includes a recess portion supporting a bearing and a recess portion supporting a bearing. The recess portions are connected to each other through a lubricant path. An oil path into which a small diameter portion of a pipe-shaped member is inserted and a connection oil path connecting between the oil path and the lubricant path are connected to each other via a boss portion. The side cover includes a circumference wall portion provided with a plurality of bolt holes. The boss portion is disposed at a position between two of the bolt holes adjacent to each other in a circumference direction.

5 Claims, 5 Drawing Sheets

(56) References Cited

U.S. PATENT DOCUMENTS 10,876,620 B2 * 12/2020 Suwa ................. F16H 57/0426
2011/0244999 A1 10/2011 Nakamura

* cited by examiner

DRIVING FORCE TRANSMISSION APPARATUS

TECHNICAL FIELD

The present invention relates to a driving force transmission apparatus.

BACKGROUND ART

Patent Document 1 discloses use of working oil leaked via a seal ring as a lubricant for a bearing.

Patent Document 2 discloses a lubricant supply pipe supported by a guide (chain guide, belt guide) for an endless member.

The use of the leaked working oil as the lubricant as in Patent Document 1 causes fluctuation of the lubricant amount (leak oil amount).

The lubricant supplied through the lubricant supply pipe (lubrication pipe) can be more stably supplied than the leak oil. Thus, for example, a method of extending the lubrication pipe so that the lubricant can be supplied to the bearing through the lubrication pipe for achieving a stable lubricant amount may be employed.

In view of this, a method of establishing an appropriate lubricant supply line for supplying a lubricant with a lubrication pipe extended has been called for.

Prior Art Documents
Patent Document 1: JP2016-114161A
Patent Document 2: JP2011-208796A

SUMMARY OF INVENTION

According to an aspect of the present invention, a driving force transmission apparatus includes:
a lubrication pipe; and
a case member to which the lubrication pipe is connected, wherein
the case member includes:
a first supporting portion that supports a first bearing member;
a second supporting portion that supports a second bearing member;
a first lubricant path connecting the first supporting portion and the second supporting portion to each other;
a boss portion into which the lubrication pipe is inserted, the boss portion being connected to the first lubricant path; and
a plurality of bolt holes, and
the boss portion is disposed at a position between two adjacent ones of the plurality of bolt holes.

With the above aspect of the present invention, the lubricant can be supplied to the first lubricant path through the lubrication pipe via the boss portion, whereby the amount of lubricant can be stabilized.

The boss portion is provided at the position between two adjacent bolt holes, so that the strength improvement function can be additionally provided.

With the lubrication pipe extended, the appropriate lubricant supply line can be established for supplying the lubricant.

DESCRIPTION OF EMBODIMENTS

An embodiment of the present invention is described below with a case where a driving force transmission apparatus is a chain continuously variable transmission 1 described as an example.

Figure 1A:
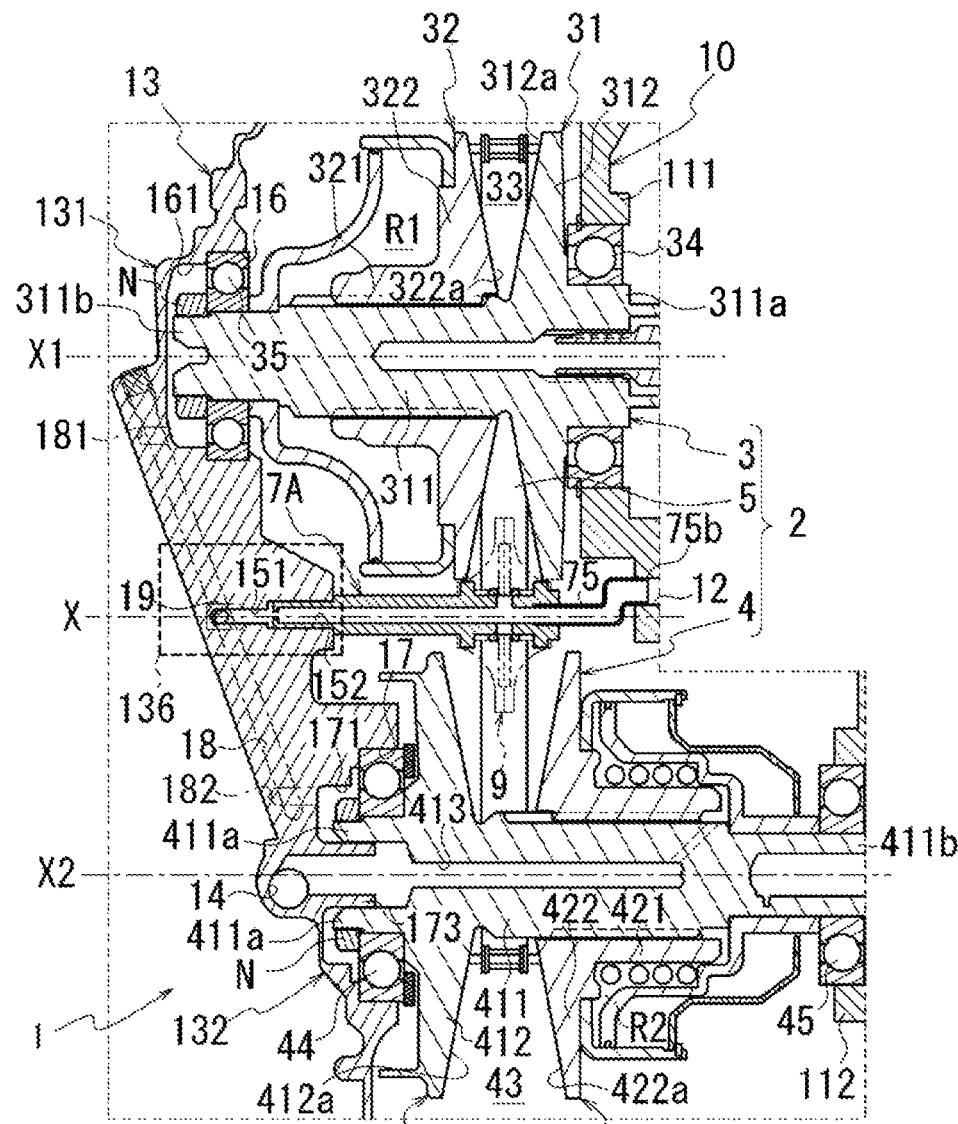
FIGS. 1A and 1B are diagrams illustrating a section around a variator of a chain continuously variable transmission.
Figure 1B:
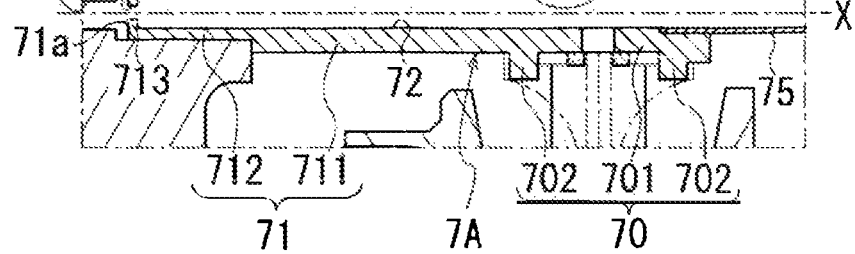

FIGS. 1A and 1B are diagrams illustrating a section around a variator 2 of the chain continuously variable transmission 1.

Figure 2A:
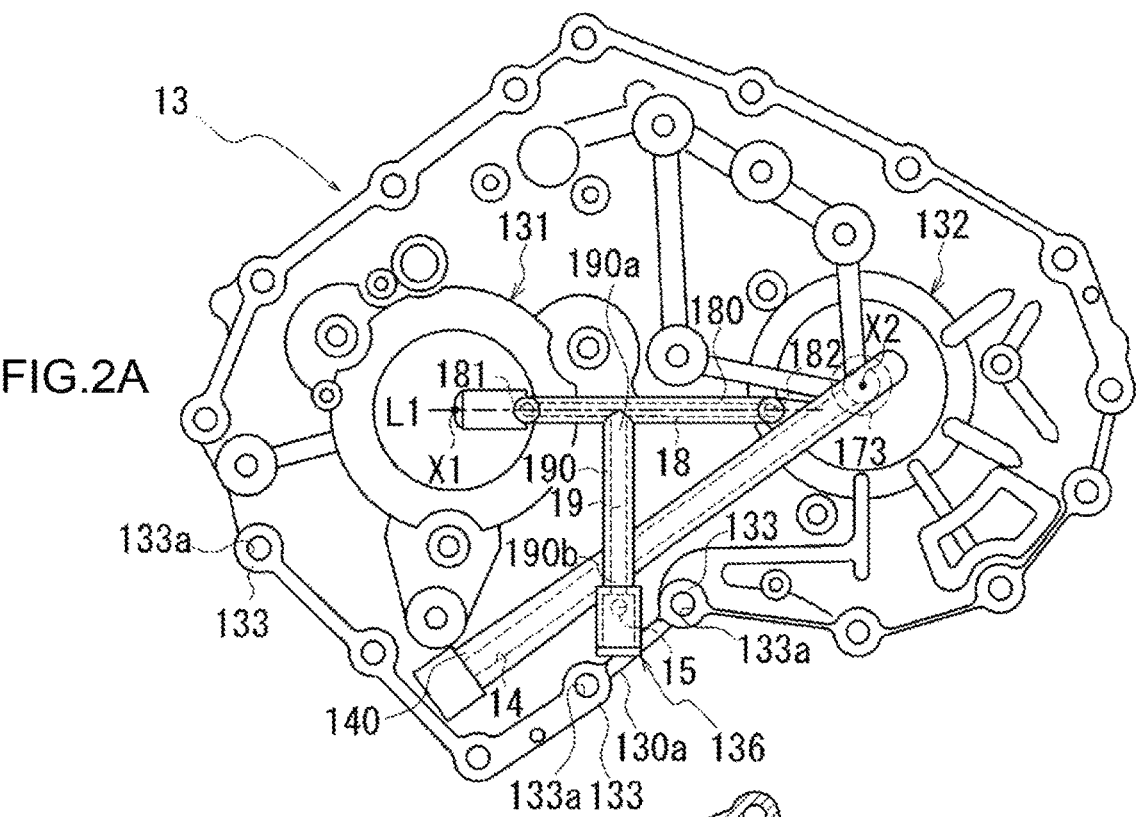
FIGS. 2A and 2B are diagrams is a diagram illustrating a side cover.
Figure 2B:
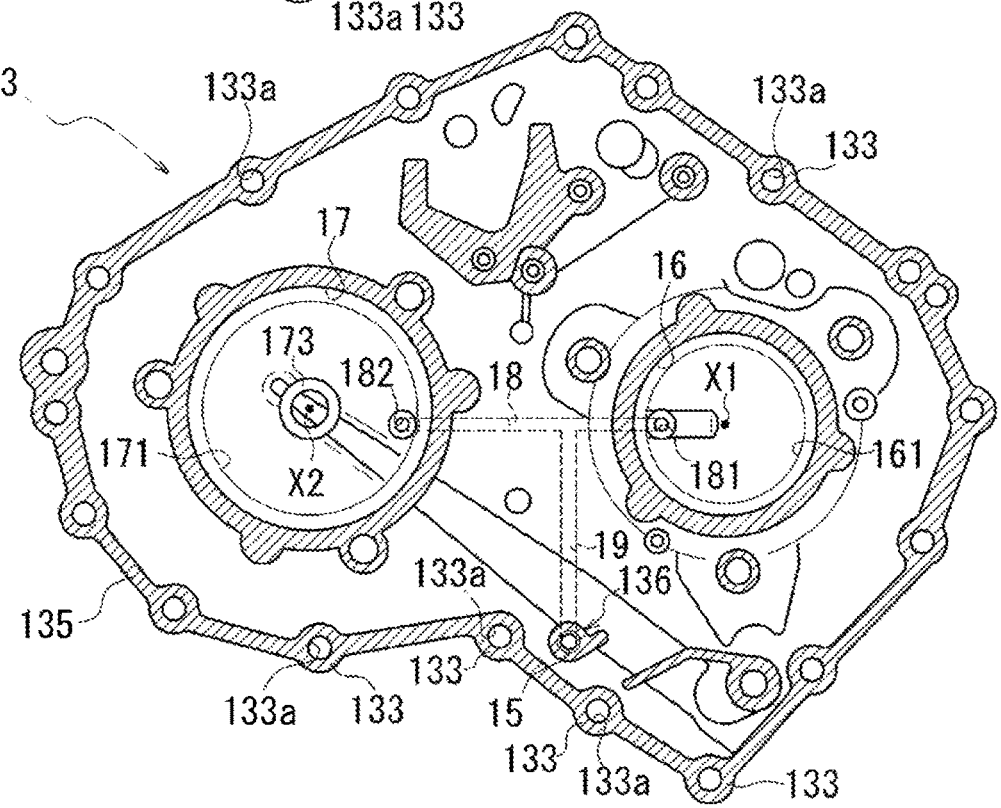

FIGS. 2A and 2B are diagrams illustrating a side cover 13. FIG. 2A is a plan view of the side cover 13 as viewed from the outer side of the continuously variable transmission 1 (side opposite to a transmission case 10). FIG. 2B is a plan view of the side cover 13 as viewed from the transmission case 10.

In FIG. 2B, a region to be joined with a portion of the transmission case 10 is hatched.

As illustrated in FIG. 1A, the variator 2 of the chain continuously variable transmission 1 for a vehicle includes a pair of pulleys (a primary pulley 3 and a secondary pulley 4) and an endless chain 5 (endless member) wound around the pair of pulleys.

The primary pulley 3 includes a fixed pulley 31 and a movable pulley 32.

The fixed pulley 31 includes a shaft portion 311 arranged along a rotation axis X1 and a sheave portion 312 extending outward in a radial direction from the outer circumference of the shaft portion 311.

The movable pulley 32 includes an annular base portion 321 fit on the shaft portion 311 of the fixed pulley 31, and a sheave portion 322 extending outward in the radial direction from the outer circumference of the annular base portion 321.

The movable pulley 32 is provided to be movable in an axial direction (direction along the rotation axis X1) of the shaft portion 311 in a state where rotate thereof relative to the fixed pulley 31 is restricted.

The sheave portion 312 of the fixed pulley 31 and the sheave portion 322 of the movable pulley 32 face each other while being separated from each other in the direction along the rotation axis X1.

In the primary pulley 3, a V-shaped groove 33 on which the chain 5 is wound is formed between a sheave surface 312a of the fixed pulley 31 and a sheave surface 322a of the movable pulley 32.

In the primary pulley 3, the movable pulley 32 is displaced in the direction along a rotation axis X1 in response to adjustment of supply pressure to an oil chamber R1 provided to the movable pulley 32. Thus, a groove width of the V-shaped groove 33 between the sheave surfaces 312a and 322a changes in accordance with the supply pressure, resulting in a change in a winding radius of the chain 5 in the primary pulley 3.

The shaft portion 311 of the fixed pulley 31 has one end portion 311a and the other end portion 311b in the direction along the rotation axis X1 on which bearings 34 and 35 are respectively fit. The bearing 35 fit on the other end portion 311b is positioned in the direction along the rotation axis X1 by means of a nut N screwed on the outer circumference of the shaft portion 311.

The one end portion 311a of the shaft portion 311 in the direction along the rotation axis X1 is rotatably supported by a support wall 111 on the side of the transmission case 10, via the bearing 34.

The other end portion 311b of the shaft portion 311 in the direction along the rotation axis X1 is rotatably supported by a supporting portion 131 of the side cover 13, via the bearing 35.

As illustrated in FIG. 2A, the side cover 13 is formed in a size capable of covering an opening of the transmission case 10.

The side cover 13 has an outer circumference portion provided with bolt bosses 133 including bolt holes 133a. The outer circumference portion of the side cover 13 is provided with a plurality of the bolt bosses 133 arranged at an interval along the circumference direction.

As illustrated in FIG. 2B, the outer circumference portion of the side cover 13 is provided with a circumference wall portion 135 on which the bolt holes 133a are open, as viewed from the transmission case 10.

The circumference wall portion 135 is provided over the entire circumference of the outer circumference portion of the side cover 13 in the circumference direction. The circumference wall portion 135 is joined to a circumference wall portion (not illustrated) of the transmission case 10 over the entire circumference with no gap in between, when the side cover 13 is assembled to the transmission case 10.

In the present embodiment, the side cover 13 is fixed to the transmission case 10, with bolts (not illustrated) inserted through the bolt holes 133a of the side cover 13 and screwed into the circumference wall portion (not illustrated) of the transmission case 10.

In the side cover 13, a supporting hole 16 for the bearing 35 is open on a region on the inner side of the circumference wall portion 135.

A recess portion 161 for preventing interference with the shaft portion 311 (see FIG. 1A) of the fixed pulley 31 is formed in a center portion of the supporting hole 16 as viewed in the direction along the rotation axis. In the recess portion 161, a communication path 181 communicating with a lubricant path 18 described later, is open.

As illustrated in FIG. 1A, the secondary pulley 4 includes a fixed pulley 41 and a movable pulley 42.

The fixed pulley 41 includes a shaft portion 411 arranged along a rotation axis X2 and a sheave portion 412 extending outward in a radial direction from the outer circumference of the shaft portion 411.

The movable pulley 42 includes an annular base portion 421 fit on the shaft portion 411 of the fixed pulley 41, and a sheave portion 422 extending outward in the radial direction from the outer circumference of the annular base portion 421.

The movable pulley 42 is provided to be movable in an axial direction (direction along the rotation axis X2) of the shaft portion 411 in a state where rotation thereof relative to the fixed pulley 41 is restricted.

The sheave portion 412 of the fixed pulley 41 and the sheave portion 422 of the movable pulley 42 face each other while being separated from each other in the direction along the rotation axis X2.

In the secondary pulley 4, a V-shaped groove 43 on which the chain 5 is wound is formed between the sheave surface 412a of the fixed pulley 41 and the sheave surface 422a of the movable pulley 42.

In the secondary pulley 4, the movable pulley 42 is displaced in the direction along the rotation axis X2 in response to adjustment of supply pressure to an oil chamber R2 provided to the movable pulley 42. Thus, a groove width of the V-shaped groove 43 between the sheave surfaces 412a and 422a changes in accordance with the supply pressure, resulting in a change in a winding radius of the chain 5 in the secondary pulley 4.

The shaft portion 411 of the fixed pulley 41 has one end portion 411a and the other end portion 411b in the direction along the rotation axis X2 on which bearings 44 and 45 are respectively fit. The bearing 44 fit on one end portion 411a is positioned in the direction along the rotation axis X2 by means of a nut N screwed on the outer circumference of the shaft portion 411.

The other end portion 411b of the shaft portion 411 in the direction along the rotation axis X2 is rotatably supported by a support wall 112 of the transmission case 10, via the bearing 45.

The one end portion 411a of the shaft portion 411 in the direction along the rotation axis X2 is rotatably supported by a supporting portion 132 of the side cover 13, via the bearing 44.

An oil hole 413 is provided in the shaft portion 411. The oil hole 413 linearly extends along the rotation axis X2 passing through the center of the shaft portion 411, from the one end portion 411a toward the other end portion 411b of the shaft portion 411.

In the side cover 13, a supporting hole 17 for the bearing 44 is open in a portion facing the transmission case 10 (see FIG. 2B) A recess portion 171 for preventing interference with the shaft portion 411 (see FIG. 1A) of the fixed pulley 41 is formed in a center portion of the supporting hole 17 as viewed in the direction along the rotation axis X2.

As illustrated in FIG. 2B, in the recess portion 171, a communication path 182 communicating with the lubricant path 18 described later, is open.

The recess portion 171 of the secondary pulley 4 is in communication with the recess portion 161 of the primary pulley 3, through the lubricant path 18.

As illustrated in FIG. 1A, the recess portion 171 of the secondary pulley 4 is provided with an annular wall portion 173 in a center portion of the recess portion 171.

The annular wall portion 173 has a cylindrical shape surrounding the rotation axis X2, and has the outer circumference on which the one end portion 411a of the shaft portion 411 is fit. In this state, the one end portion 411a of the shaft portion 411 is rotatably supported by the annular wall portion 173.

The annular wall portion 173 has the inner side in which an oil path 14 is open.

The oil path 14 is provided in a rib 140 (see FIG. 2A) bulging from a surface of the side cover 13, so that working oil is supplied into the oil path 14 from an oil pressure control circuit not illustrated.

The working oil supplied to the oil path 14 from the oil pressure control circuit is supplied into the oil hole 413 of the fixed pulley 41, and then is supplied into the oil chamber R2 of the secondary pulley 4.

In this process, a part of the working oil supplied into the oil hole 413 leaks into the recess portion 171 through a gap between the annular wall portion 173 and the one end portion 411a of the shaft portion 411.

The working oil thus leaked into the recess portion 171 functions as a lubricant for lubricating the bearing 44 supported by the supporting hole 17.

As illustrated in FIG. 2A, the surface of the side cover 13 is provided with the supporting portions 131 and 132, protruding toward the viewer side in the drawing sheet, for supporting the bearings 35 and 44.

The supporting portions 131 and 132 have substantially circular outer circumferences respectively surrounding the rotation axes X1 and X2 with a predetermined gap in between.

The supporting portion 131 and the supporting portion 132 are provided with a gap in between, and the surface of the side cover 13 is provided with a rib 180 for reinforcement.

The rib 180 bridges between the supporting portion 131 and the supporting portion 132, and is linearly formed along a line L1.

The line L1 linearly extends in the radial direction with respect to the rotation axis X1 as viewed in the direction along the rotation axis X1, with the supporting portion 131 and the supporting portion 132 positioned on the line L1.

In the present embodiment, the lubricant path 18 described above is provided using the rib 180 (see FIG. 1A, FIG. 2A, and FIG. 2B).

The lubricant path 18 is provided inside the rib 180, and has one end in communication with the recess portion 161 of the primary pulley 3, via the communication path 181 provided in the side cover 13.

The lubricant path 18 has the other end in communication with the recess portion 171 on the side of the secondary pulley 4 via the communication path 182 provided in the side cover 13.

As illustrated in FIG. 2A, the rib 190 has one end 190a connected to an intermediate position of the rib 180 in the longitudinal direction. The rib 190 extends linearly in a direction orthogonal to the line L1.

The rib 190 has the other end 190b connected to a boss portion 136 provided at an outer circumference edge 130a of the side cover 13. The boss portion 136 is formed to have a larger outer diameter than the rib 190.

In the side cover 13, the boss portion 136 is integrally and continuously formed with the circumference wall portion 135 and is positioned between bolt bosses 133 and 133 adjacent to each other in the circumference direction, to increase the rigidity and strength of the part close to the outer circumference edge 130a of the side cover 13.

A connection oil path 19 is provided in the rib 190. The connection oil path 19 has one end in communication with the lubricant path 18 in the rib 180 from a direction orthogonal to the line L1.

The connection oil path 19 has the other end in communication with the oil path 15 provided in the side cover 13, at a portion of the boss portion 136.

As illustrated in FIG. 1A, the oil path 15 extends linearly along an axial line X in the boss portion 136 of the side cover 13. The axial line X is a straight line in parallel with the rotation axes X1 and X2. The axial line X is positioned to be coaxial with the center axial line of a chain guide supporting member 7A described later.

The oil path 15 includes a connection portion 151 and an insertion portion 152 with a larger inner diameter than the connection portion 151. The connection portion 151 and the insertion portion 152 are coaxially arranged on the axial line X and are arranged in series in the direction along the axial line X.

At the portion of the boss portion 136, the connection portion 151 is in communication with the connection oil path 19 described above. The insertion portion 152 is open in a surface of the side cover 13 facing the transmission case 10.

In the insertion portion 152, a pipe-shaped member 71 (small diameter portion 712) of a chain guide supporting member 7A described later, is inserted in the direction along the axial line X.

Figure 3:
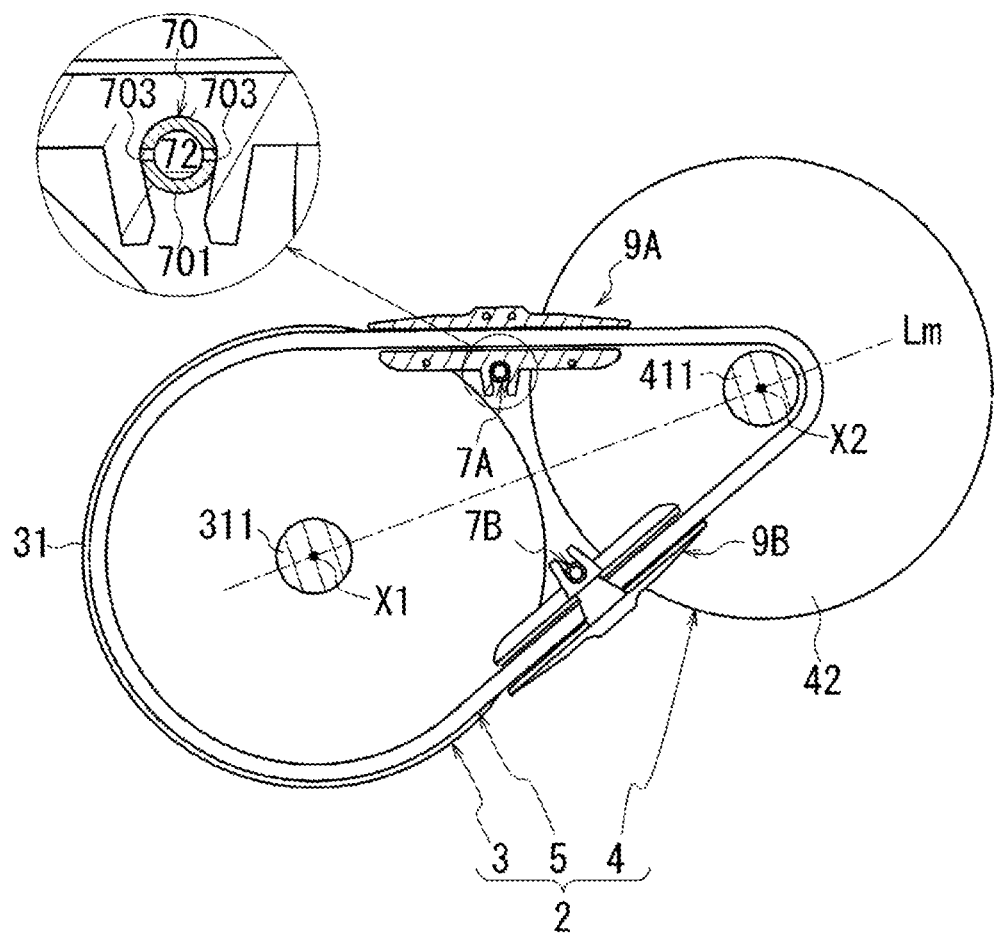
FIG. 3 is a diagram illustrating an arrangement of a chain guide in the variator.

FIG. 3 is a diagram illustrating an arrangement of chain guides 9 (9A and 9B) in the variator 2. In FIG. 3, one chain guide 9A is illustrated in a cross-sectional view, and the other chain guide 9B is illustrated in side view for the sake of description. Furthermore, the chain 5 is simply illustrated.

Figure 4:
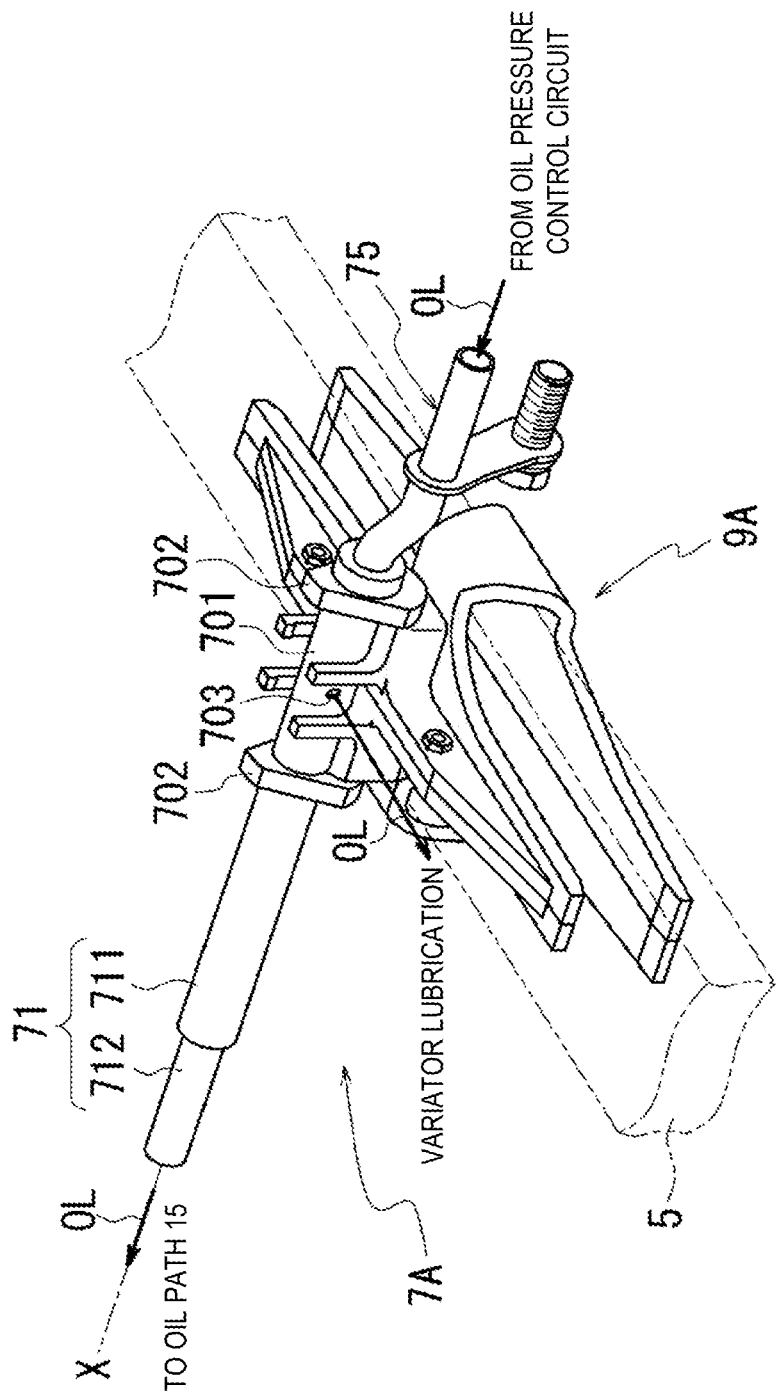
FIG. 4 is a perspective view illustrating the chain guide.

FIG. 4 is a perspective view illustrating the chain guide supporting member 7A and the chain guide 9A.

As illustrated in FIG. 3, the continuously variable transmission 1 has the chain 5 wound around the primary pulley 3 and the secondary pulley 4, to be supported by the V-shaped grooves 33 and 43 (see FIG. 1A) of the primary pulley 3 and the secondary pulley 4.

Thus, when the continuously variable transmission 1 is driven, movement including slacking and vibration occurs in a region (unwound region) of the chain 5 between the primary pulley 3 and the secondary pulley 4.

The continuously variable transmission 1 includes the chain guides 9 (9A and 9B) to regulate this movement of the chain 5.

The chain guides 9A and 9B are provided to be in symmetrical positional relationship about a line segment Lm connecting between the rotation axis X1 of the primary pulley 3 and the rotation axis X2 of the secondary pulley 4.

The chain guides 9A and 9B are respectively provided on the upper and lower sides in a vertical direction, in a state where the continuously variable transmission 1 is installed in a vehicle.

The chain guides 9A and 9B are pivotally supported by the chain guide supporting members 7A and 7B bridging between the transmission case 10 and the side cover 13 (see FIG. 3 and FIG. 4).

As illustrated in FIG. 3, the chain guide supporting members 7 (7A and 7B) are provided in orientations along the rotation axes X1 and X2 on the inner side of the chain 5, as viewed in the directions of the rotation axes X1 and X2.

The chain guide supporting members 7 (7A and 7B) are also in the symmetrical positional relationship about the line segment Lm.

As illustrated in FIG. 1B, the chain guide supporting member 7A is formed with a lubricant supplying member 70 and a pipe-shaped member 71 arranged in series and integrally formed.

The lubricant supplying member 70 has a cylindrical base portion 701. The base portion 701 has the outer circumference provided with flange-shaped supporting plate portions 702 and 702 separated from each other in the direction of the center axis (axial line X) of the base portion 701.

The oil path 72 linearly extending in the direction along the axial line X is provided on the inner side of the base portion 701. This oil path 72 is provided through the lubricant supplying member 70 in the direction along the axial line X, to reach the pipe-shaped member 71.

The one end 75a of a lubricant tube 75 is inserted in the side of the oil path 72 of the lubricant supplying member 70 opposite to the pipe-shaped member 71 (right side in FIG. 1B).

The lubricant tube 75 has the other end 75b inserted in the oil pressure supply path 12 provided in the transmission case 10 (see FIG. 1A).

As illustrated in FIG. 1B, in the base portion 701 of the lubricant supplying member 70, injection holes 703 are provided in a region between the supporting plate portion 702 and the supporting plate portion 702 in the direction along the axial line X.

The injection hole 703 is provided through the cylindrical base portion 701 in a direction of a line along the diameter thereof. In the continuously variable transmission 1, the lubricant supplying member 70 is provided with one of the injection holes 703 and 703 facing the primary pulley 3, and the other one of the injection holes 703 and 703 facing the secondary pulley 4 (see FIG. 3, enlarged view).

Lubricant OL is supplied to the oil path 72 of the lubricant supplying member 70 through the lubricant tube 75 connected to the oil pressure supply path 12.

Thus, the lubricant OL supplied to the oil path 72 is injected toward the primary pulley 3 and the secondary pulley 4 through the injection holes 703 and 703.

Thus, the variator 2 (the primary pulley 3, the secondary pulley 4, and the chain 5) are lubricated.

As illustrated in FIG. 1B, the pipe-shaped member 71 integrally formed with the lubricant supplying member 70 includes a large diameter portion 711 and the small diameter portion 712.

The large diameter portion 711 and the small diameter portion 712 are arranged in series in the direction along the axial line X, and are integrally formed.

The oil path 72 of the lubricant supplying member 70 described above is formed through the large diameter portion 711 in the direction along the axial line X to reach a point close to a distal end 71a of the pipe-shaped member 71.

The small diameter portion 712 has a distal end in the direction along the axial line X sealed by a bottom wall portion 713. A through hole 713a is formed through the bottom wall portion 713 in the direction along the axial line X, at the center of the bottom wall portion 713.

The through hole 713a is formed to have an inner diameter (opening area) that is smaller than an inner diameter (opening area) of the injection hole 703 of the lubricant supplying member 70 described above.

The amount of the lubricant OL injected through the injection hole 703, of the lubricant OL supplied to the oil path 72 through the lubricant tube 75, is set to be larger than the amount of the lubricant OL leaking from the through hole 713a.

The small diameter portion 712 of the pipe-shaped member 71 is inserted in the insertion portion 152 of the oil path 15 provided in the side cover 13, in the direction along the axial line X.

The small diameter portion 712 of the pipe-shaped member 71 has the large diameter portion 711 inserted into the oil path 15 to a position to be in contact with an end surface 134 of the boss portion 136 in which the oil path 15 is open.

As described above, the oil path 15 is connected to the connection oil path 19 at the portion of the boss portion 136 (see FIG. 2A). The connection oil path 19 is in communication with the recess portion 161 of the primary pulley 3 and the recess portion 171 of the secondary pulley 4, via the lubricant path 18.

Thus, of the lubricant OL supplied to the oil path 72 of the chain guide supporting member 7A via the lubricant tube 75, the lubricant OL flowed into the oil path 15 is supplied to the recess portion 161 of the primary pulley 3 and to the recess portion 171 on the side of the secondary pulley 4, through the connection oil path 19 in communication with the oil path 15 at the portion of the boss portion 136 and through the lubricant path 18 in communication with the connection oil path 19.

Operations in the continuously variable transmission 1 with the configuration described above will be described below.

When the continuously variable transmission 1 is driven, the lubricant OL supplied from the oil pressure control circuit (not illustrated) flows into the oil path 72 of the chain guide supporting member 7A through the lubricant tube 75.

The lubricant OL flowed into the oil path 72 is injected toward the primary pulley 3 and the secondary pulley 4 through the injection holes 703 and 703, so that the variator 2 (the primary pulley 3, the secondary pulley 4, and chain 5) is lubricated.

Of the lubricant OL flowed into the oil path 72 of the lubricant supplying member 70, the lubricant OL flowed into the oil path 72 of the pipe-shaped member 71 flows into the oil path 15, into which the small diameter portion 712 of the pipe-shaped member 71 is inserted, through the through hole 713a.

The lubricant OL flowed into the oil path 15 is supplied to the recess portion 161 of the primary pulley 3 and to the recess portion 171 of the secondary pulley 4, through the connection oil path 19 and the lubricant path 18.

Thus, a part of the lubricant OL supplied to the oil path 72 of the chain guide supporting member 7A is supplied to the recess portion 161 the primary pulley 3 and to the recess portion 171 of the secondary pulley 4, to be finally used for the lubrication of the bearing 35 of the primary pulley 3 and the bearing 44 of the secondary pulley 4.

In this manner, the existing oil path 72 for the lubricant OL used for lubricating the variator 2 can further be used for lubricating the bearing 35 and the bearing 44 using a part of the lubricant OL used for the lubrication for the variator 2.

Thus, the bearing 35 and the bearing 44 can be more actively lubricated compared with a case where the bearing 35 and the bearing 44 are lubricated using a part of the working oil leaked into the recess portion 171 of the side cover 13 through a gap between the annular wall portion 173 and the shaft portion 411 (one end portion 411a) of the secondary pulley 4.

The flowrate of the lubricant OL used for lubricating the variator 2 can be more effectively controlled than the flowrate of the working oil leaked into the recess portion 171. Thus, the bearing 35 and the bearing 44 can be more appropriately lubricated compared with the case where the working oil leaked is used.

The side cover 13 has the rib 180, in which the lubricant path 18 is formed (see FIG. 2A), bridging between the supporting portion 131 of the bearing 35 and the supporting portion 132 (second supporting portion) of the bearing 44.

Furthermore, the connection oil path 19 for supplying the lubricant OL to the lubricant path 18 is formed in the rib 190, and the rib 190 is connected to the rib 180 in the radial direction of the line L1 along the longitudinal direction of the rib 180.

Thus, the two ribs 180 and 190 arranged in orientations crossing each other increase the rigidity and strength in the region of the side cover 13 between the supporting portion 131 and the supporting portion 132.

Thus, the active lubrication of the bearings 35 and 44 and the rigidity and strength of the side cover 13 can both be achieved.

The above-described continuously variable transmission 1 (automatic transmission) according to the present embodiment has the following configuration.

(1) The continuously variable transmission 1 includes:

the chain guide supporting member 7A (lubrication pipe), and the side cover 13 (case member) to which the chain guide supporting member 7A is connected.

The side cover 13 includes: the supporting portion 131 (first supporting portion) that supports the bearing 35 (first bearing member), and the supporting portion 132 (second supporting portion) that supports the bearing 44 (second bearing member).

The side cover 13 includes the lubricant path 18 (first lubricant path) connecting the recess portion 161 of the supporting portion 131 and the recess portion 171 of the supporting portion 132 to each other.

The side cover 13 includes the oil path 15 into which the small diameter portion 712 of the pipe-shaped member 71 of the chain guide supporting member 7A is inserted, and the connection oil path 19 connecting the oil path 15 to the lubricant path 18.

The oil path 15 and the connection oil path 19 are connected to each other at the portion of the boss portion 136.

The side cover 13 includes the circumference wall portion 135 provided with the plurality of bolt holes 133a.

The boss portion 136 is disposed at a position between two bolt holes 133a and 133a adjacent to each other in the circumference direction, out of the plurality of bolt holes 133a provided to the circumference wall portion 135.

The boss portion 136 is disposed between the two adjacent bolt holes 133a and 133a as viewed in at least a direction in which the chain guide supporting member 7A (lubrication pipe) is inserted (see FIG. 2B)

With the oil path 15 in the boss portion 136 connected to the connection oil path 19 at the portion of the boss portion 136, the lubricant OL supplied to the oil path 15 from the pipe-shaped member 71 can be supplied to the lubricant path 18.

Thus, the bearings 35 and 44 can be lubricated with the lubricant OL supplied into the oil path 15 from the pipe-shaped member 71 and supplied to the supporting portion 131 supporting the bearing 35 and to the supporting portion 132 supporting the bearing 44.

The lubricant supplied from the pipe-shaped member 71 is a lubricant supplied from the oil pressure supply path 12 provided to the transmission case 10, and is not leak oil. Thus, a stable amount of lubricant OL can be supplied to the bearings 35 and 44.

Furthermore, as illustrated in FIG. 2A, the boss portion 136 is positioned between the bolt bosses 133 and 133 adjacent to each other in the circumference direction as viewed in the insertion direction of the chain guide supporting member 7A (lubrication pipe) and thus can increase the rigidity and the strength of the outer circumference edge 130a of the side cover 13. Thus, a strength improvement function can be additionally provided to the side cover 13.

With the boss portion 136, receiving the chain guide supporting member 7A (lubrication pipe), provided in a (thick) portion such as a portion between the two adjacent bolt holes 133a and 133a, the chain guide supporting member 7A (lubrication pipe) can be stably supported on the side cover 13. Thus, stable oil path connection and oil supply can be achieved while suppressing the weight increase.

The boss portion 136 is defined as a portion including the oil path 15 (hole) into which the chain guide supporting member 7A (lubrication pipe) is inserted. The portion indicated by a region defined by a broken line in FIG. 1A corresponds to the boss portion 136.

In the present embodiment, the boss portion 136 has a portion protruding toward the chain guide supporting member 7A (right side in FIG. 1A). With the protruding portion, a thicker portion is formed in the side cover 13 to contribute to an increase in the rigidity of the side cover 13.

With the boss portion 136 having the protruding portion in a case of the side cover 13 having a small thickness in the direction along the axial line X, a larger insertion depth (engagement allowance) can be provided for the chain guide supporting member 7A (lubrication pipe). Thus, a stable connection state of the chain guide supporting member 7A (lubrication pipe) supported by the side cover 13 can be achieved.

The continuously variable transmission 1 has the following configuration.

(2) The lubricant path 18 forming the first lubricant path is provided in the rib 180 having a shape of a straight line connecting the supporting portion 131 and the supporting portion 132 of the side cover 13.

The lubricant path 18 is also formed to have a shape of a straight line in the rib 180.

With the lubricant path 18 formed to have a shape of a straight line, the rib 180 in which the lubricant path 18 is formed can be additionally provided with a function to serve as a strength rib against stress produced between the supporting portion 131 and the supporting portion 132 of the side cover 13.

The continuously variable transmission 1 has the following configuration.

(3) The boss portion 136 and the lubricant path 18 are connected to each other by the connection oil path 19 having a shape of a straight line.

The connection oil path 19 forming the second lubricant path is formed to have a shape of a straight line in the rib 190 having a shape of a straight line.

With the connection oil path 19 formed to have a shape of a straight line, a shorter distance between the boss portion 136 and the lubricant path 18 can be achieved compared with a case where the connection oil path 19 is formed to have a curved or bend shape.

Thus, the boss portion 136 and the lubricant path 18 can be connected to each other with a shorter distance therebetween.

A longer distance between the boss portion 136 and the lubricant path 18 results in an increased oil path resistance. This leads to a larger load on a pump supplying the lubricant OL, which may result in compromised fuel efficiency of the vehicle having the continuously variable transmission 1 installed.

With the configuration described above, the oil path resistance decreases with a decrease in the distance between the boss portion 136 and the lubricant path 18, whereby improvement of the fuel efficiency of the vehicle having the continuously variable transmission 1 can be expected.

Figure 5:
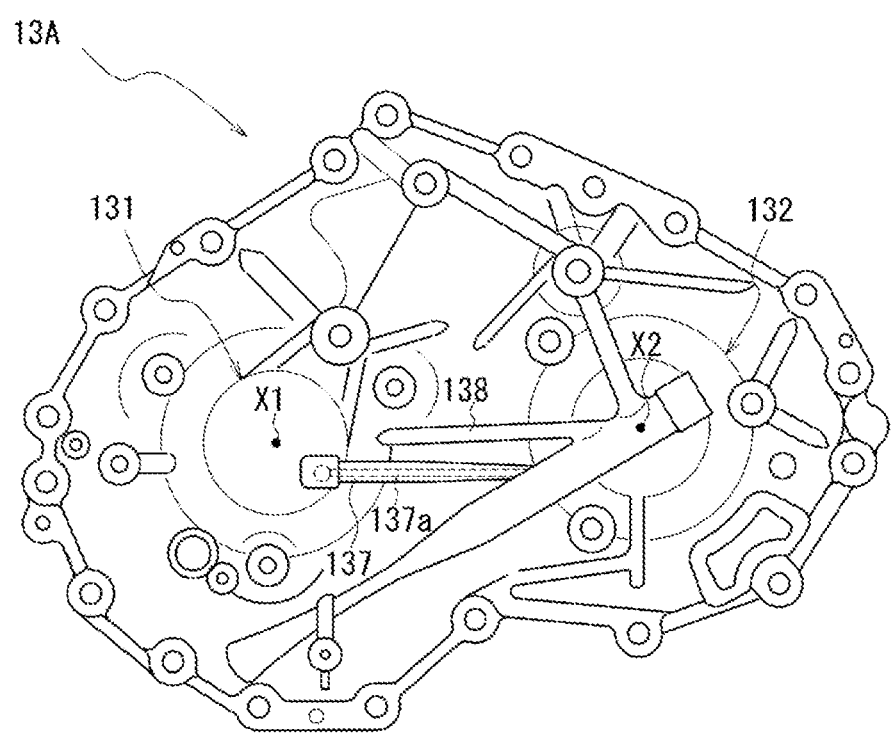
FIG. 5 is a diagram illustrating a side cover according to a comparative example.

FIG. 5 illustrates a side cover 13A according to a conventional example adopting a configuration in which the lubricant OL leaked into the supporting portion 132 is supplied to the supporting portion 131 through a connection path 137a provided in the rib 137.

This side cover 13A requires a reinforcement rib 138 to be additionally provided to bridge between the supporting portion 131 and the supporting portion 132, to guarantee the rigidity and strength of the region between the supporting portion 131 and the supporting portion 132.

As described above, the side cover 13 according to the present embodiment adopts the configuration in which the bearings 35 and 44, in the supporting portion 131 and the supporting portion 132, are actively lubricated with the lubricant OL, used for lubricating the variator 2, supplied to the lubricant path 18 from the oil pressure control circuit (not illustrated).

In this context, the side cover 13 is provided with the rib 190 provided with the connection oil path 19 for supplying the lubricant OL to the lubricant path 18. This rib 190 serves in place of the rib 138 of the side cover 13A according to the conventional example.

Furthermore, the rigidity and strength of the region between the supporting portion 131 and the supporting portion 132 are increased with the rib 190 connected to the rib 180.

This enables the increase in the rigidity and strength of the side cover 13 as well as active lubrication of the bearings 35 and 44 provided to the supporting portions 131 and 132.

The continuously variable transmission 1 has the following configuration:

(4) the rib 180 and the rib 190 are orthogonal to each other.

The lubricant path 18 in the rib 180 and the connection oil path 19 in the rib 190 are orthogonal to each other.

With this configuration, the two ribs 180 and 190 arranged in the orientation orthogonal to each other can increase the rigidity and strength of the region between the supporting portion 131 and the supporting portion 132 in the side cover 13.

In the embodiment described above, the example where the rib 180 and the rib 190 are orthogonal to each other is described. However, the rib 180 and the rib 190 do not necessarily need to be orthogonal to each other. The rib 180 and the rib 190 may be connected to each other at a predetermined crossing angle, as long as the distance (length) of the connection oil path 19 in the rib 190 would not be excessively long.

The continuously variable transmission 1 has the following configuration.

(4) The chain guide supporting member 7A (lubrication pipe) has the injection holes 703 and 703 (lubricant injection holes) through which the lubricant OL is injected toward the pair of pulleys (primary pulley 3, secondary pulley 4) included in the continuously variable transmission 1.

In the continuously variable transmission 1, a part of the lubricant OL for lubricating the variator 2 is used for lubricating the bearings 35 and 44 provided to the supporting portions 131 and 132.

Thus, the bearings 35 and 44 can be appropriately lubricated with the oil path 72 of the existing chain guide supporting member 7A extended and with the side cover 13 provided with the following additional processes:

(a) providing the side cover 13 with the oil path 15 into which the pipe-shaped member 71 (small diameter portion 712) of the chain guide supporting member 7A is inserted; and (b) providing the side cover 13 with the connection oil path 19 connecting between the oil path 15 and the lubricant path 18.

Thus, the bearings 35 and 44 can be appropriately lubricated by using the existing chain guide supporting member 7A as is and performing the additional processes (a) and (b) only.

This means that no new lubrication pipe needs to be additionally provided for enabling the appropriate lubrication of the bearings 35 and 44, whereby cost increase can be suppressed.

The lubricant OL for the variator 2 is supplied through the oil pressure supply path 12. Thus, the amount of lubricant OL supplied to the bearings 35 and 44 can be more appropriately adjusted, compared with the case where the bearings 35 and 44 are lubricated using leak oil of the oil pressure control circuit.

Thus, the bearings 35 and 44 can be favorably prevented from being insufficiently or excessively lubricated.

If lubrication of the bearings 35 and 44 becomes excessive, the excessively supplied lubricant OL becomes resistance against the rotation of the primary pulley 3 and the secondary pulley 4, which may result in compromised fuel efficiency of the vehicle having the continuously variable transmission 1 installed. This can be favorably prevented since the bearings 35 and 44 are favorably prevented from being excessively lubricated as described above.

Furthermore, the following configuration is added to increase the rigidity and strength of the side cover 13.

(c) The boss portion 136 connecting the oil path 15 and the connection oil path 19 to each other is disposed at a position between the two bolt holes 133a and 133a adjacent to each other in the circumference direction.

Thus, the rigidity and strength around the circumference wall portion 135 of the side cover 13 can further be increased.

Although the case of the chain continuously variable transmission mechanism is described as an example in the above embodiment, any configuration may be employed for the endless member of the continuously variable transmission as long as the rotation can be transmitted between the primary pulley 3 and the secondary pulley 4.

Thus, the endless member may be a belt formed by arranging plate-shaped elements with slits on both sides stacked to be in an annular form, and binding the elements using annular rings inserted in the slits.

In the above embodiment, the case where the driving force transmission apparatus is an automatic transmission for a vehicle is described as an example. The driving force transmission apparatus according to the invention of the present application is not limited to the automatic transmission for a vehicle only.

The invention can be applied to an apparatus with a configuration in which in a gear train including a plurality of gears, at least one of the gears scrapes up the oil inside a case containing the gear train. An example of such an apparatus includes a decelerator that outputs a result of decelerating input rotation.

While the embodiments of the present invention have been described above, the present invention is not limited to aspects shown in these embodiments. Changes and modifications can be made appropriately within the scope of the technical ideas of the present invention.

The present application claims a priority of Japanese Patent Application No. 2017-252221 filed with the Japan Patent Office on Dec. 27, 2017, all the contents of which are hereby incorporated by reference.

What is claimed is:

1. A driving force transmission apparatus comprising:
a lubrication pipe; and
a case member to which the lubrication pipe is connected, wherein
the case member includes:
a first supporting portion that supports a first bearing member;
a second supporting portion that supports a second bearing member;
a first lubricant path connecting the first supporting portion and the second supporting portion to each other;

a boss portion into which the lubrication pipe is inserted, the boss portion being connected to the first lubricant path; and a plurality of bolt holes, and the boss portion is disposed at a position between two adjacent ones of the plurality of bolt holes.

2. The driving force transmission apparatus according to claim 1, wherein the first lubricant path has a shape of a straight line connecting between the first supporting portion and the second supporting portion.

3. The driving force transmission apparatus according to claim 2, wherein the boss portion and the first lubricant path are connected to each other by a second lubricant path having a shape of a straight line.

4. The driving force transmission apparatus according to claim 3, wherein the first lubricant path and the second lubricant path are orthogonal to each other.

5. The driving force transmission apparatus according to claim 1, wherein the lubrication pipe has a lubricant injection hole through which a lubricant is injected toward a pulley of the driving force transmission apparatus.

\* \* \* \* \*